Feb. 19, 1957 C. I. CEDERHOLM 2,781,584
MEASURING DEVICE
Filed Dec. 8, 1955
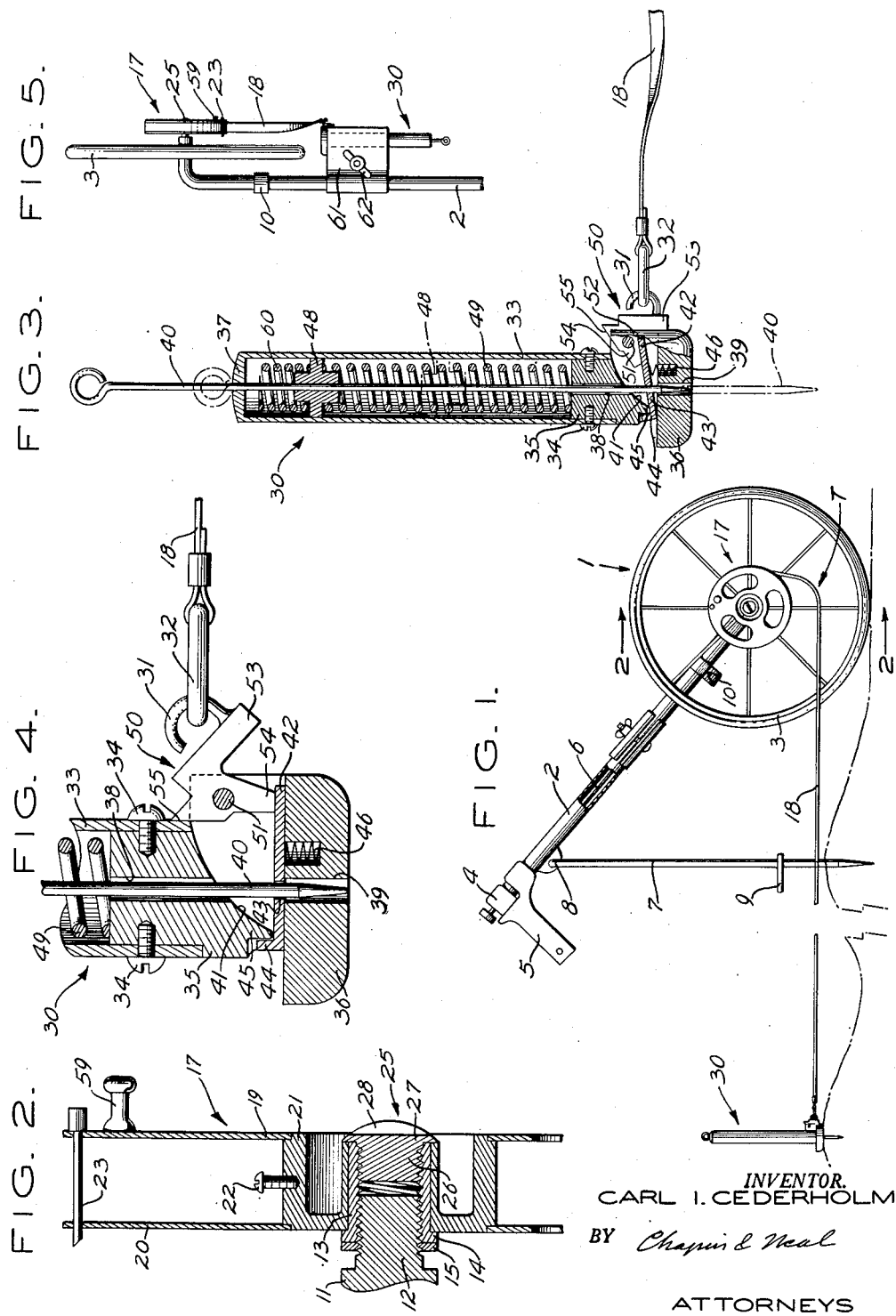
INVENTOR.
CARL I. CEDERHOLM
BY Chapin & Neal
ATTORNEYS United States Patent Office 2,781,584
Patented Feb. 19, 1957

2,781,584

MEASURING DEVICE

Carl I. Cederholm, South Worthington, Mass.

Application December 8, 1955, Serial No. 551,837

6 Claims. (Cl. 33—138)

This invention relates to an improvement in measuring devices of the type which includes a measuring wheel of predetermined circumference which is propelled over the ground and drives a counting device which indicates the distance traversed by the wheel. Such a measuring wheel is described in detail in my prior Patent No. 2,614,330, issued October 21, 1952.

Measuring wheels measure the surface including ground contours. They have found an extensive use in measuring planting acreage on farms where as in the case of rolling terrane or a hillside, surface area is the determining factor. The area of planting acreage has acquired further importance where planting restrictions imposed by county, state or Federal agencies are involved, and a greater degree of accuracy is required. Minor discrepancies in "wheel" obtained measurements may accumulate to substantial amounts where the line of measurement is over plowed land, the wheel dropping into the furrows, or crosses drainage ditches, dry or filled, and similar surface variations.

One advantage of wheel measuring is that it is a one man operation. However, where obstacles to acceptable wheel measuring of the character mentioned are encountered recourse is necessary to tape measurements which require two operators.

It is the object of the present invention to provide a device operable by a single operator which will provide either wheel or tape measurement or both. A further object is the provision of means by which a farmer may lay out his planting acreage with greater assurance that it will be approved, or by which county, state or other authorities may check reported acreage with a minimum force of inspectors.

Other and further objects and advantages will be made apparent in the disclosure of the drawing and in the following specification and claims.

In the accompanying drawing,

Fig. 1 is a side elevation of the device showing the parts in operative position for tape measurement;

Fig. 2 is a sectional view substantially on line 2—2 of Fig. 1;

Fig. 3 is a detail sectional view of the tape-releasable stake element;

Fig. 4 is a fragmentary view of the releasable lock of Fig. 3 showing the parts in untacked position; and Fig. 5 is a fragmentary plan view showing one manner of releasably securing the stake member to the wheel frame.

Referring to the drawing a measuring wheel is generally indicated at 1. This measuring wheel which may take any suitable form such as that shown in the above-mentioned patent includes a hollow handle shaft 2 having a wheel 3 of predetermined circumferential size rotatably mounted at its lower end. A counter 4 of conventional construction is mounted adjacent a hand grip 5 secured to the upper end of shaft 2. The counter is driven to register the rotation of the wheel and therefore the distance over which it has been propelled, by a shaft indicated at 6 and housed within the hollow shaft 2.

A rod 7 is pivoted to shaft 2 at 8 and is provided with a short, side extension 9 by which the free end may be forced into the ground by the operator's foot, to hold the wheel stationary in an upright position as shown in Fig. 1. When not in use the rod 7 is swung into substantial parallelism with shaft 2 and engage on a hook member 10 welded or otherwise secured to the shaft 2.

The hub 11 of the wheel (Fig. 2) is provided with a threaded extension 12 on which is threaded a sleeve 13 having a flange 14 at its inner end, the sleeve being held fixed on the extension 12 and wheel hub 11 by a lock nut 15. A reel, generally indicated at 17, for carrying a length of tape 18 (Fig. 1) is mounted on sleeve 13. As best shown in Fig. 2, in which the tape is omitted for clearness, this reel includes spaced side members 19 and 20 welded or otherwise secured to a hub 21. The hub is provided with means, such as a machine screw 22, by which one end of the tape may be fixed to the reel, and suitable means, such as a spring pin 23 frictionally but releasably engaged through openings in the side members 19 and 20, are provided by which the tape is maintained wound on the reel when not in use. Hub 21 is rotatable on sleeve 13. A clamp member 25 having a shank 26 threaded into the open end of sleeve 13 is formed with a flange 27 which, when member 25 is turned tightly into sleeve 13 clamps the hub 21 immovably between flanges 14 and 27, or when backed off permits free rotation of the reel or applies a desired degree of restraint to the rotation of the reel on sleeve 13 as later described. Conveniently member 25 is formed on its outer face with means to facilitate its rotation such as a diametrical ridge 28.

The free end of the tape, Figs. 1 and 3, is releasably connected to a self-releasing stake, generally indicated at 30, by a hook 31 carried by the stake and an eye 32 carried by the end of the tape and engageable over the hook.

As best shown in Fig. 3 stake 30 comprises a cylindrical housing 33, the lower end of which telescopes over and is secured, as by screws 34, to a stud 35 extending upwardly from a foot member 36. The upper end of housing 33, stud 35, and foot 36 are provided with aligned openings 37, 38 and 39 respectively, through which a pointed rod 40 slidably extends. Stud 35 is slotted adjacent the foot member 36 as indicated at 41. A plate 42 formed with an opening 43, through which rod 40 passes, is pivotally mounted in the slot 41 by flange 44 engaging a rib 45 extending across the ceiling of the slot. Plate 42 is normally held in an upwardly inclined position as shown in Fig. 3 by a spring 46 seated in a suitable recess in the foot member 36. The opening 43 is so dimensioned that when plate 42 is in the inclined position shown, rod 40 is held against upward movement but can be pushed downwardly through opening 43 by the yielding of the spring 46 and when plate 42 is held in a position at right angles to the rod the latter moves freely through all the openings.

A collar 48 is fixed, as by welding, to rod 40 within the housing 30 and a spring 49 is positioned between block 48 and shank 35 to be compressed when rod 40 is moved downwardly, plate 42 acting as a releasable "ratchet" to hold the rod in a downward position against the action of spring 49.

Plate 42 is adapted to be released by an angular dog 50 pivoted by a pivot pin 51 between spaced lugs 52 extending upwardly from foot 36. Hook 31, previously mentioned is fixed to one arm 53 of the dog 50 below the pivot 51, and the lower face of the other arm 54 of the dog is engaged by plate 42 under the action of spring 46. Rotary movement of plate 42 and dog 50 by the force of spring 46 is limited by the engagement of arm 53 with the foot 36. The holding grip of plate 42 on rod 40 may be released by rotating dog 50 counterclockwise as viewed in Fig. 3 to cause the arm 54 of the dog to depress plate 42 against the action of spring 46 to a substantially horizontal position to thereby release the grip of the edges of opening 43 on the rod. The end face of arm 54 is flattened and of sufficient area so that when brought into face to face contact with plate 42 the latter is held locked in releasing position by spring 46, as shown in Fig. 4, until an appreciable predetermined rotative force in a clockwise direction, as viewed in Fig. 4 is applied to the dog to restore it to the position of Fig. 3. Counterclockwise rotation of the dog is limited to such locking position by engagement of the face 55 of arm 54 with the housing 33.

When in the course of a measuring operation the advancing measuring wheel encounters a plowed area or other surface condition which will cause inaccurate wheel measurement and such surface is of such extent that the accumulated error will be objectionable, the operator removes pin 23 and adjusts clamp member 25 to permit free or desired frictionally restrained rotation of the reel 17, places the stake 30, with the end of the tape 18 attached thereto, on the ground at the point where the wheel measurement is discontinued and forces the lower end of the rod 40 into the ground against the action of spring 49 as shown in dotted lines in Figs. 1 and 3. Upon release of the driving pressure on the rod 40, spring 46 raises plate 42 into choking engagement with the rod holding the latter against withdrawal by spring 49. The wheel is then advanced, the tape being withdrawn from the reel, the member 25 being backed off to let the reel rotate freely or under predetermined frictional restraint as desired. When the wheel again reaches smooth ground, the wheel is halted and rod 7 engaged in the ground to hold the wheel upright as in Fig. 1. The tape 18 is then drawn straight and the measurement read from the tape at a point T at or directly above the point of tangency of the ground and wheel as indicated in Fig. 1. Spring 46 is of sufficient power so that the tape may be drawn straight without rotating dog 50. A quick pull on the tape will, however, rotate the dog, depressing plate 42 and bringing the flat end of arm 54 into face to face engagement with plate 42 (Fig. 4) to simultaneously release the rod 40 from the restraint of the plate and lock the plate in depressed position. With the rod free of restraint spring 49 expands to withdraw the rod from the ground, permitting the stake to thereafter be drawn to the operator as the latter winds the tape back on the reel. A handle 59 is fixed to the outer side of the reel to facilitate winding the tape on the reel and returning the stake to the reel.

Preferably a relatively short heavy spring 60 is loosely positioned between collar 48 and the closed upper end of housing 33 to prevent the collar 48 from shock producing engagement with the adjacent end of the housing as the rod is forcibly impelled upwardly by spring 49 upon release of the rod by the plate 42. Spring 49 will usually be of a character to store sufficient power to withdraw the rod 40 from relatively hard packed ground and when the rod is engaged in soft ground a minimum of the power of spring 49 is absorbed in withdrawing the rod from the ground and in the absence of a shock absorbing device such as is provided by spring 60, the collar 48 may be projected against the upper end of the housing with destructive force, and in any event spring 60 is desirable to prevent undue movement of the stake as a whole as the rod is withdrawn from the ground.

It will be understood that when the conditions requiring tape measurement prevail over a distance greater than one tape length the stake when drawn up to the wheel as described may be reinserted in the ground and further full or partial tape measurements made until a ground surface suitable for wheel measurement is reached.

It will also be understood that after each tape measuring operation it is necessary to return the dog 50 to the position of Fig. 3 before the stake is again used by driving rod 40 into the ground.

When not in use the stake 30 may be suitably clamped to the wheel handle or reel. As shown in Figs. 1 and 5 handle shaft 2 of the wheel is provided with a clamp 61 for receiving the stake as shown in Fig. 5, the clamp being tightened by a wing nut 62 to hold the stake in place. Pin 23 prevents the tape from unreeling and if desired or necessary the member 25 may be set to apply a slight friction to the reel. Alternatively, when the connection of the tape to the stake is releasable, as shown, and the stake is clamped to the handle shaft as in Fig. 5, the tape may be released from the stake and the reel clamped to the bearing sleeve 14. This arrangement has the advantage of reducing wear on the bearing sleeve and is preferable where relatively infrequent tape measurements are required. Where tape measurements are frequent the tape end is kept hooked to the stake and the member 25 is kept set for operative frictional restraint on the reel, as this avoids repeated connection of the tape to the reel and resetting of member 25. Releasability of the tape from the stake and of the reel from sleeve 14 has the further advantage that tapes carrying different markings, as feet, meters, or "chain" units may be substituted one for the other. However, the tape may be permanently connected to the stake latch and the reel permanently but rotatably mounted on the wheel hub.

By the present invention a complete one-man operated measuring device of particular advantage in farm use is provided and which is adaptable to a wide range of measuring needs whether wheel or tape measurements or both are desired.

What is claimed is:

1. In a ground measuring device having a handle member and a wheel of predetermined circumference rotatably mounted on one end of the handle member; a reel mounted on the wheel for independent coaxial rotation with respect thereto, a stake having a body member, a rod reciprocably mounted on said body member for extension relative thereto for insertion in the ground to hold the stake to the ground, a spring biased to retract said rod from its extended position, a latch carried by the body member for holding said rod in extended position against the action of the spring, a measuring tape connected at one end to said latch and at the other end to the reel, and a second spring biasing the latch to rod-holding position, said second spring being yieldable to a predetermined pulling force on the tape, in excess of that necessary to hold the tape taut, to release the latch and permit retraction of the rod by the first spring to thereby release the stake from the ground.

2. A ground measuring device as in claim 1 including means to impose a predetermined degree of restraint to rotation of the reel with respect to the wheel.

3. A ground measuring device as in claim 2 including means to prevent unwinding of the tape from the reel, the connection of the tape to the latch being releasable.

4. A ground measuring device as in claim 1 including a buffer spring carried by the rod and engageable with said body member at a predetermined point of retraction of the rod with respect to the body member to oppose the first spring and cushion the return of the rod to retracted position.

5. A stake comprising a body member, a rod reciprocably mounted on said body member for extension relative thereto for insertion in the ground to hold the stake to the ground, a spring biased to retract said rod from its extended position, a latch carried by the body member for holding said rod in extended position against the action of the spring, means for connecting a measuring tape to said latch and a second spring biasing the latch to rod-holding position, said second spring being yieldable to a predetermined pulling force on said tape connecting means to release the rod.

6. A stake comprising an elongated cylindrical housing, a ground engaging base secured to one end of the housing, a rod slidably extending through said housing and base, a collar fixed to the rod, a spring positioned between said collar and base to resist extension of the rod outwardly of the base, a latch carried by the base for holding the rod extended outwardly of the base against the action of the spring, means for connecting a measuring tape to said latch, a second spring biasing the latch to rod holding position, said second spring being yieldable to a predetermined pulling force on said tape connecting means to release the rod, and a third spring positioned between said collar and the end of the housing remote from the base and engageable with the last-mentioned end of the housing at a predetermined point of retraction of the rod with respect to the base to oppose the first spring and cushion the return of the rod to contracted position.

References Cited in the file of this patent

UNITED STATES PATENTS 2,549,287    Brennan  ---------------- Apr. 17, 1951

FOREIGN PATENTS 4,904    Great Britain ----------- July 8, 1893